United States Patent Office 3,229,861
Patented Jan. 18, 1966

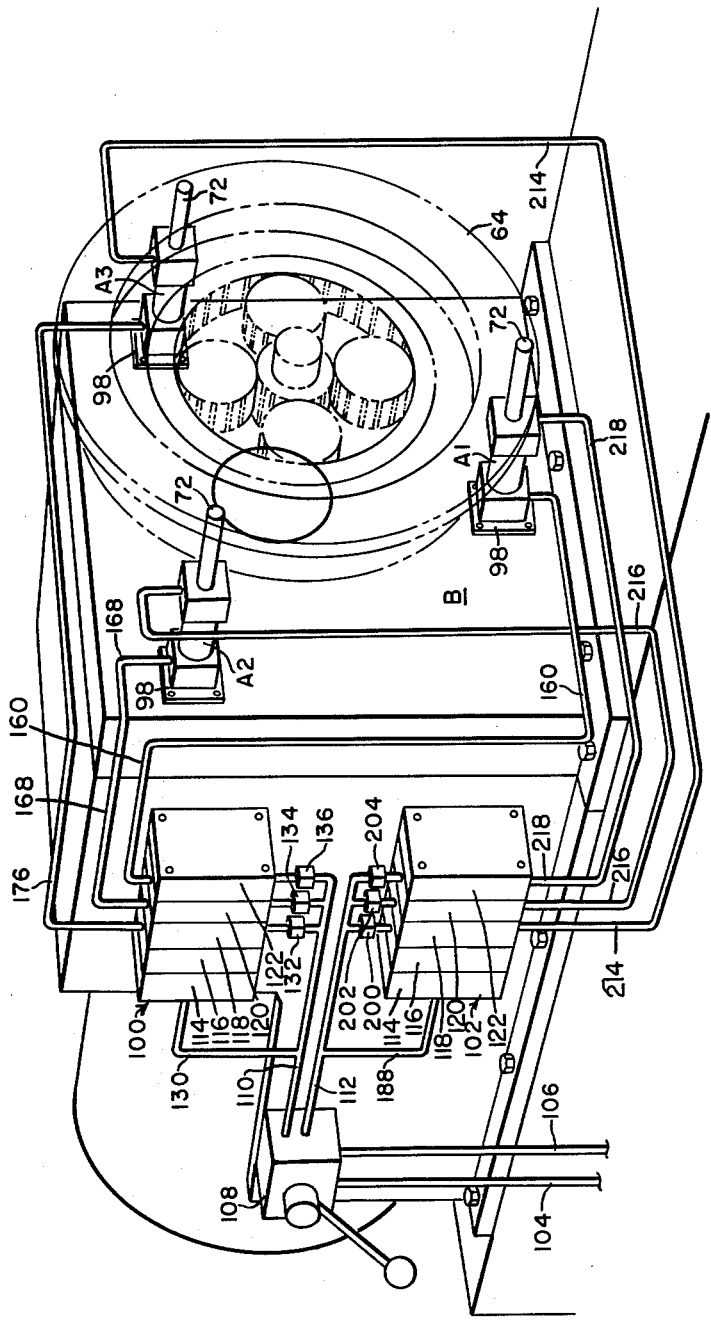

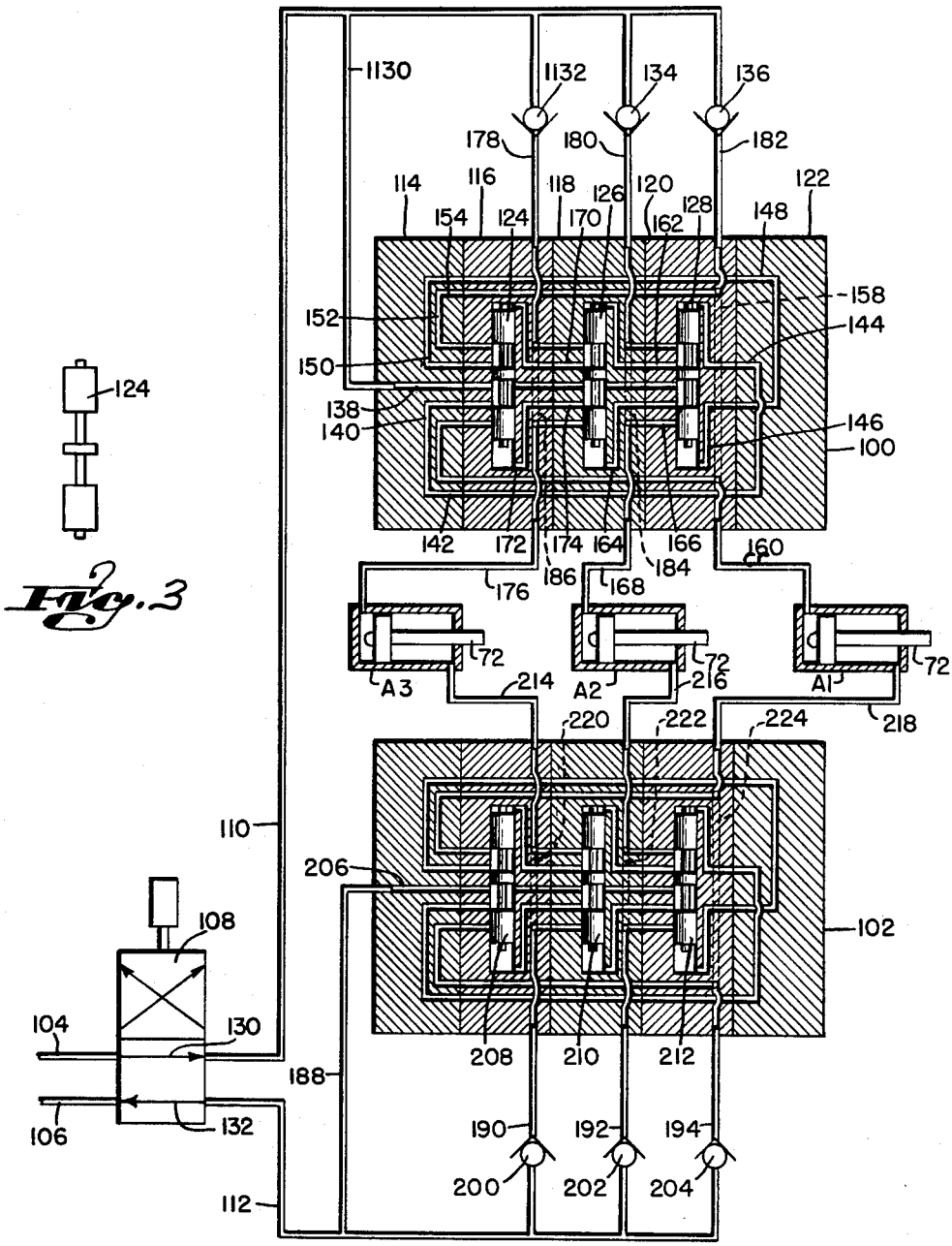

3,229,861
FLUID DISTRIBUTOR VALVE MEANS FOR ACTUATING GEAR SHIFTING ASSEMBLY OF A CONTOUR-ROLL TURNING LATHE
Jack N. Binns, 4886 Oaklawn Drive, Cincinnati 27, Ohio
Original application Nov. 3, 1959, Ser. No. 850,575, now Patent No. 3,127,801, dated Apr. 7, 1964. Divided and this application Feb. 17, 1964, Ser. No. 356,680
4 Claims. (Cl. 222—249)

This application is a division of application S.N. 850,575, now Patent 3,127,801.

An object of the invention is to provide an improved hydraulic system for moving an object with ease and great precision, along a straight line, without any perceptible tendency to cock or tilt such object.

The foregoing and other objects are attained by the means described herein and illustrated upon the accompanying drawings, in which:

FIG. 1 is a perspective view of the hydraulic system of the present invention associated with the headstock and a gear shifter ring of a roll lathe.

FIG. 2 is a schematic view of a hydraulic shifting mechanism for the gearing illustrated upon FIG. 1.

FIG. 3 is a detail view showing a one-piece ram.

Reference may be made to my U.S. Patent 3,127,801 for illustrating a typical application of the hydraulic system of this divisional application, and with particular reference to FIG. 1 hereof, the letter B denotes the front wall of a headstock and the numeral 64 denotes a bodily displaceable shifter ring which, as set forth in Patent 3,127,801, is adapted to be moved along a straight line toward and from front wall B for shifting a coupling ring from a low speed to a high speed position, and back to the low speed position by means of the hydraulic cylinder means denoted by A1, A2 and A3.

In accordance with the present invention, the shifting means employed comprises a series of hydraulic cylinders arranged upon the front wall B of the headstock, so that their piston rods 72 act upon the shifter ring 64 with equal force to advance and retract said ring without perceptible cocking.

In the example illustrated, three equally spaced hydraulic cylinders are employed, these being identified by the characters A1, A2, and A3. The number of cylinders may be increased if considered necessary or desirable. The bases 98 of all the cylinders are fixedly mounted upon the front wall B of the headstock, or upon any other fixed support which will ensure projection of the piston rods in parallel straight line.

Referring now to FIG. 2, 100 and 102 indicate generally two fluid distributors of hydraulic fluid under pressure, the function of which is to feed fluid to the cylinders A1, A2, and A3, sequentially in very small charges, until the piston rods of all the cylinders are fully extended. Thereby the shifter ring 64 of FIG. 1 may be moved to its extreme right hand position.

By reversing the entry of fluid into the distributors, the rods of all the pistons may be retracted in like manner, to return the shifter ring to the left-hand limit of travel.

In FIGS. 1 and 2, the pair of pipes 104 and 106 may represent a source of hydraulic fluid under pressure, controlled by a flow reversing valve indicated schematically at 108, whereby fluid may be directed at will into either of the feed pipes 110 or 112. The arrangement is such that when one feed pipe is charged with fluid from the source, the other feed pipe becomes an exhaust or return line to the source.

Each distributor comprises a body constituted of a plurality of connected block sections 114, 116, 118, 120 and 122, containing various passageways along which the hydraulic fluid may flow to act upon one-piece rams indicated at 124, 126, and 128, which may be rapidly reciprocated in their respective chambers shown. As will become apparent later, the rams are fluid-projected sequentially, and repeatedly, from one end to the other of their respective chambers, as long as fluid under pressure is supplied from the source 104–106, and until the fluid distributed thereby completely fills the cylinders A1, A2, and A3 at one side of their respective pistons. According to FIG. 2, the cylinders are ready to be filled with fluid behind their pistons, to project the piston rods from the cylinders, or toward the right.

Assuming that fluid under pressure is valved through the feed lines as indicated by the arrows 130 and 132, FIG. 2, the fluid can travel only through conduits 110 and 130, due to the presence of check valves 132, 134, 136. From 130 it enters bore 138 which is common to all the ram chambers. Entering the chamber of ram 124, the fluid follows the course: 140, 142, 144, to the ram 128, which moves downwardly under the pressure of fluid imposed, causing a displacement of fluid through bores 146, 148, 150, 152, 154, 158, and tube 160, to minutely advance the piston of cylinder A1.

Ram 128 being now lowered, fluid from common line 138 can pass through bore 162 to apply pressure to the top of ram 126, causing it to move to fully lowered position, thereby to displace fluid from beneath said ram through bores 164, 166, and into tube 168, to minutely advance the piston of cylinder A2.

Rams 128 and 126 being now lowered, fluid from common line 138 can pass through bore 170 to the top of the remaining ram 124, and depresses said ram to fully lowered position. Fluid thus displaced from beneath ram 124 takes the course 172, 174, 176, to minutely advance the piston of cylinder A3.

Thus it is apparent that the hydraulic cylinders A1, A2, and A3 have been advanced in succession, by very slight but equal amounts, to begin moving the shifter ring 64 of FIG. 1, toward the right. After all the rams 124, 126, 128 are disposed at the opposite ends of their respective chambers, pressure of fluid from the source 104–106 continues to act upon the rams for sequentially returning them to the FIG. 2 position, resulting in another cycle of minute fluid charges delivered to cylinders A1, A2, and A3, for again slightly advancing their piston rods. The paths of fluid travel for so returning the rams to the initial position of FIG. 2 can be traced on the diagram, but it is believed unnecessary to burden this disclosure with a lengthy explanation thereof. Suffice it to state that repetition of the ram movements in sequence many times over, and in rapid succession, will result in stepping advancement of the piston rods 72 of all the cylinders A1, A2, and A3, to their outer limits of travel, for moving the shifter ring 64 to its extreme right-hand position.

It might here be stated that check valves 132, 134, and 136 prevent fluid under pressure from the source of supply from entering the distributor through the tubes 178, 180, and 182. The valves, however, will permit fluid flow in the opposite direction, when the reversing valve 108 is manipulated to exhaust fluid from the distributor 100 through conduit 110. The broken double line 158 indicates a fluid passageway connecting tube 182 with the tube 160 leading to hydraulic cylinder A1; the broken double line 184 indicates a fluid passageway connecting tube 180 with the tube 168 leading to hydraulic cylinder A2; and the broken double line 186 indicates a fluid passageway connecting tube 178 with the tube 176 leading to hydraulic cylinder A3. These shunt passageways 158, 184, and 186 make possible the exhausting of fluid from the head ends of cylinders A1, A2, and A3 back to the source of supply, when distributor 102 is activated to charge said cylinders at their rod ends, for withdrawing the piston rods 72. Withdrawal or retraction of the piston rods moves the shifter ring 64 to the left.

It is to be understood that distributor 102 has ram action similar to that of distributor 100, in enforcing a step-by-step retraction of the piston rods of cylinders A1, A2, and A3. Distributor 102 is placed in action by manipulation of the reversing valve 108 to direct fluid pressure into feed line 112, in which case the other feed line 110 becomes a fluid exhaust or return line. When 112 is pressured, fluid is forced to enter the distributor 102 only through conduit 188, because the branch pipes 190, 192, and 194 are limited to one-way flow courses outwardly from the distributor, by check valves 200, 202, and 204.

Distributor 102 is seen to be identical to distributor 100. It includes the common feed line 206 in fluid communication with the chambers of all the rams 208, 210, and 212. Distributor 102 also has fluid lines 214, 216, and 218 for transfer of fluid to and from the rod ends of cylinders A3, A2, and A1, respectively. Through the agency of shunt passageways 220, 222, and 224, the several fluid lines 214, 216, and 218, leading to the hydraulic cylinders, have connection with the branch lines 190, 192, and 194, respectively. In all respects the fluid passageways within the distributors, and their connections with the rams, are identical.

Distributors of the type disclosed have certain virtues of importance to the present invention. Their rams always operate in regular predetermined sequence, to deliver equal spurts of fluid to the hydraulic cylinders A1, A2, and A3, with the same sequence. Thus, the piston rods 72 will be moved in a common direction, all at the same rate, until their pistons bottom in the cylinders. With bottoming of the pistons, the rams of the distributor stop with the result that no further transfer of fluid will occur. The nature of this type distributor is such, that anything interfering with the operation of one ram results in disabling all of the rams. It is therefore impossible for one hydraulic cylinder piston 72 to lead or trail the others, for cocking or distorting the shifter ring 64.

For any additional information that might be desired concerning the distributors 100 and 102, reference is made to the Type MX Distributor manufactured by Trabon Engineering Corporation, of Solon, Ohio, under U.S. Patent 2,792,911, dated May 21, 1957.

It should further be understood that the description of the shifter ring actuating means relates to those conditions wherein the actuating cylinders A1, A2 and A3 are of equal area. However, in certain instances it may be desirable or necessary that the areas of the three or more cylinders may be different, in which event the corresponding plungers 208, 210, and 212 and 124, 126, and 128 would be proportionately different displacements to compensate for the difference in area of the pistons or cylinders fed by each, the basic requirement in any application being that each plunger displaces a volume of oil such that the piston of its respective cylinder will move the same linear distance as all other pistons in the assembly.

It should be understood that various changes and modifications may be made, within the scope of the appended claims, without departing from the spirit of the invention.

What is claimed is:

1. A distributor of fluid fed thereto under pressure by way of a supply pipe, comprising a body having formed therein a plurality of chambers, and a ram freely slidable in each chamber from end to end thereof, the body having an inlet bore common to the middle portions of all the chambers, and fluid inlet and outlet end bores one at each end of each chamber, outlet tubes equal in number to the number of rams in the body, and bores in the body arranged to convey fluid to one of the outlet tubes from either end of a chamber depending upon the position of the ram within the chamber, the rams having intermediate grooves therein and the body having additional bores therein to so direct fluid entering through said inlet bore as to displace the rams sequentially toward corresponding ends of the chambers, and to return the rams to initial position also in sequence, repeatedly so long as fluid under pressure is fed to the inlet bore, and shunt pasageways each connecting an outlet tube with the supply pipe and including one-way check valve means operative to preclude transfer of fluid under pressure from the supply pipe to the outlet tubes.

2. A distributor of fluid fed thereto under pressure by way of a supply pipe, comprising a body having formed therein a plurality of elongate chambers, and a ram freely slidable in each chamber from end to end thereof, the body having an inlet bore common to all the chambers, and outlet ports equal in number to the number of rams in the body, the body including a system of passageways so related to the ram chambers as to direct fluid entering through the inlet bore, for displacing the rams sequentially toward corresponding ends of the chambers, and returning the rams to initial position also in sequence, repeatedly so long as fluid under pressure is fed to the inlet bore and discharged through the outlet ports, and shunt passageways each connecting an outlet port with the supply pipe and including one-way check valve means operative to preclude transfer of fluid under pressure from the supply pipe to the outlet ports.

3. A distributor of fluid fed thereto under pressure by way of a supply pipe, said distributor comprising a body having three ram chambers therein, a ram freely slidable in each chamber from end to end thereof, a fluid inlet bore in the body common to the middle portion of all of the chambers, fluid outlets equal in number to the number of rams, a fluid line receiving fluid from the inlet bore through a first chamber and conducting the fluid into a second chamber to move the ram therein in one direction, a fluid line for conducting fluid displaced from the second chamber to and through the first chamber and to a first outlet, means for conducting fluid from said inlet bore to and through said second chamber and into the third chamber to move the ram in the third chamber in said one direction to displace the fluid therein, means for conducting the displaced fluid from the third chamber to a second outlet, a fluid line receiving fluid from the inlet bore through the third chamber and conducting the fluid to the first chamber to move the ram therein in said one direction to displace the fluid in the first chamber, means for conducting the fluid displaced from the first chamber to and through the third chamber to the third outlet, and means whereby reverse movement of all of the rams sequentially in the same precession as initially, is effected automatically by continued introduction of the fluid under pressure into the inlet bore.

4. A distributor of fluid fed thereto under pressure by way of a supply pipe, said distributor comprising a body having three ram chambers therein, a ram freely slidable in each chamber from end to end thereof, a fluid inlet bore in the body common to the middle portion of all of the chambers for conducting fluid under pressure to the said chambers, fluid outlets equal in number to the number of rams, a fluid line connected to a first chamber at one side of said inlet bore for conducting fluid into a second chamber at one end of the latter to move the ram therein in one direction, a fluid line connected to the opposite end of the second chamber for conducting displaced fluid into the first chamber at the other side of the inlet bore, a fluid line for conducting displaced fluid from the first chamber from adjacent the said other side of the inlet bore to a first outlet, a fluid line for conducting fluid from the second chamber at one side of the inlet bore and into the third chamber at one end of the latter to move the piston therein in said one direction, a fluid line for conducting displaced fluid from the third chamber into and from the second chamber from adjacent the other side of the inlet bore and to a second outlet, a fluid line for conducting fluid from the third chamber from one side of the inlet bore to one end of the first chamber to move the piston in the latter in said one direction, a fluid line for conducting displaced fluid from said first chamber into and from the third chamber from adjacent the other side of the inlet bore for the third chamber to the third outlet, and means whereby reverse movement of all of the rams sequentially and in the same precession is effected automatically by continued introduction of the fluid under pressure into the inlet bore.

References Cited by the Examiner
UNITED STATES PATENTS

| | | | |
|---|---|---|---|
| 2,007,156 | 7/1935 | Burrell | 222—249 X |
| 2,856,023 | 10/1958 | Graves | 222—249 X |

LOUIS J. DEMBO, *Primary Examiner.*

HADD S. LANE, *Examiner.*